(12) United States Patent
Choi et al.

(10) Patent No.: US 11,223,712 B2
(45) Date of Patent: Jan. 11, 2022

(54) ELECTRONIC DEVICE COMPRISING DECORATIVE STRUCTURE AND MANUFACTURING METHOD THEREFOR

(71) Applicant: Samsung Electronics Co., Ltd., Suwon-si (KR)

(72) Inventors: Jongmun Choi, Suwon-si (KR); Hyunsuk Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/267,912

(22) PCT Filed: May 8, 2019

(86) PCT No.: PCT/KR2019/005471
§ 371 (c)(1),
(2) Date: Feb. 11, 2021

(87) PCT Pub. No.: WO2020/050472
PCT Pub. Date: Mar. 12, 2020

(65) Prior Publication Data
US 2021/0250434 A1 Aug. 12, 2021

(30) Foreign Application Priority Data
Sep. 4, 2018 (KR) .................. 10-2018-0105170

(51) Int. Cl.
*H04M 1/00* (2006.01)
*H04M 1/02* (2006.01)
(52) U.S. Cl.
CPC ................ *H04M 1/0283* (2013.01)
(58) Field of Classification Search
CPC .. H04M 1/0264; H04M 1/0283; H04M 1/026; H04M 1/0266; H04M 1/185
See application file for complete search history.

(56) References Cited

U.S. PATENT DOCUMENTS 10,537,037 B2 * 1/2020 Hsu ..................... B32B 7/02
10,656,494 B2 * 5/2020 Qiu ...................... G02F 1/167
(Continued)

FOREIGN PATENT DOCUMENTS

JP 2002-103900 A 4/2002
JP 2012-032652 A 2/2012
(Continued)

OTHER PUBLICATIONS

International Search Report dated Aug. 16, 2019 in connection with International Patent Application No. PCT/KR2019/005471, 2 pages.
(Continued)

*Primary Examiner* — Nhan T Le

(57) ABSTRACT

An electronic device, according to various embodiments, comprises: a housing structure; a transparent plate coupled to the housing structure, defining an inner space together with the housing structure, and including an inner surface facing the inner space and an outer surface facing away from the inner space; and a decorative structure formed on an inner surface of the transparent plate in a peripheral region of the transparent plate adjacent to a portion of the housing structure. The decorative structure comprises: a first layer formed on the inner surface and including a first transparent or translucent material and a repetitive pattern of first dots in the first transparent or translucent material; and a second layer formed on the first layer and including a second transparent or translucent material and a repetitive pattern of second dots in the second transparent or translucent material, wherein when the transparent plate is viewed from above, the first dots may at least partially overlap with the second dots. Other various embodiments may be possible.

15 Claims, 15 Drawing Sheets

(56) References Cited

U.S. PATENT DOCUMENTS

| | | | |
|---|---|---|---|
| 2010/0033442 A1 | 2/2010 | Kusuda et al. | |
| 2014/0100005 A1 | 4/2014 | Bae et al. | |
| 2015/0202848 A1 | 7/2015 | Cho et al. | |
| 2016/0142522 A1* | 5/2016 | Kim | A45C 11/00 455/575.8 |
| 2021/0135151 A1* | 5/2021 | Baek | H04M 1/0268 |

FOREIGN PATENT DOCUMENTS

| | | |
|---|---|---|
| KR | 20-0380219 Y1 | 3/2005 |
| KR | 10-2008-0070424 A | 7/2008 |
| KR | 10-2014-0044996 A | 4/2014 |
| KR | 10-2015-0087886 A | 7/2015 |

OTHER PUBLICATIONS

Written Opinion of the International Searching Authority dated Aug. 16, 2019 in connection with International Patent Application No. PCT/KR2019/005471, 4 pages.

\* cited by examiner

ELECTRONIC DEVICE COMPRISING DECORATIVE STRUCTURE AND MANUFACTURING METHOD THEREFOR

CROSS-REFERENCE TO RELATED APPLICATIONS

This application is a 371 of International Application No. PCT/KR2019/005471 filed on May 8, 2019, which claims priority to Korean Patent Application No. 10-2018-0105170 filed on Sep. 4, 2018, the disclosures of which are herein incorporated by reference in their entirety.

BACKGROUND

1. Field

Various embodiments of the disclosure relate to an electronic device having a decorative structure and a manufacturing method thereof.

2. Description of Related Art

Electronic devices can be applied to various fields that are closely associated with our life. These electronic devices are released in various sizes depending on their functions and the preferences of users, and functionality, a slim thickness and an appearance thereof can become important design elements. For example, since the electronic devices of different manufacturers have roughly the same functions, users prefer electronic device having better and more beautiful designs.

The electronic device may include a housing forming at least a part of an appearance, and a transparent plate (e.g., a cover plate or a glass plate) may be disposed at least a part of the housing. For example, a decorative structure (e.g., a printed structure) including at least one hue may be disposed in at least a partial region between the housing and the transparent plate, and various hues may be presented according to the decorative structure projected through the transparent plate in the electronic device.

This hue presenting method may include a gradation depiction structure in which a hue is gradually brightened or darkened. A proper combination of a mirror printing layer and a color coating layer may be used for this gradation depiction. A printing method may include an inkjet method, a laser method, or a silk screen dot printing method.

The inkjet method has an excellent sense of gradation representation, but requires an expensive facility, has difficulty in reducing a process time, and may be expensive compared to silk screen printing due to addition of different kinds of processes. The laser method produces ordinary gradation representation, but requires an expensive facility, is difficult to reduce a process time, and may also be made expensive due to addition of different kinds of processes compared to silk screen printing. The silk screen dot printing method has excellent productivity and is inexpensive because all processes are possible using the same kinds of processes and thus no investment cost is incurred for additional facilities, but because natural gradation representation based on two layers of a mirror printing layer and a color coating layer is difficult achieve to limitations of patterning based on screen engraving, and when dots are visually distinguished, gradation depiction may be unnatural.

Various embodiments of the disclosure make it possible to provide an electronic device having a decorative structure and a manufacturing method thereof.

According to various embodiments, an electronic device having a decorative structure configured to enable natural gradation depiction and a manufacturing method thereof can be provided.

SUMMARY

According to various embodiments, an electronic device may include: a housing structure; a transparent plate coupled to the housing structure, configured to define an inner space together with the housing structure, and configured to include an inner surface facing the inner space and an outer surface facing away from the inner space; and a decorative structure formed on the inner surface of the transparent plate in a peripheral region adjacent to a portion of the housing structure. The decorative structure may include: a first layer that is formed on the inner surface and includes a first transparent or translucent material and a repetitive pattern of first dots in the first transparent or translucent material; and a second layer that is formed on the first layer and includes a second transparent or translucent material and a repetitive pattern of second dots in the second transparent or translucent material. When the transparent plate is viewed from above, the first dots may be at least partially overlapped with the second dots.

According to various embodiments, a manufacturing method of a decorative structure disposed on an inner surface of a transparent plate may include: a step of forming a first layer that includes a first transparent or translucent material on the inner surface of the transparent plate and a repetitive pattern of first dots in the first transparent or translucent material; a step of forming a second layer, which includes a second transparent or translucent material and a repetitive pattern of second dots in the second transparent or translucent material, on the first layer; and a step of forming a third layer that is formed on the second layer and includes an opaque material.

According to various embodiments, gradation depiction having a natural and excellent quality of design using dots disposed in multiple layers can be implemented without a different kind of additional method. Simultaneously, productivity can be improved, and manufacturing costs can be reduced.

BRIEF DESCRIPTION OF THE DRAWINGS

In conjunction with description of the drawings, identical or similar reference numerals can be used for identical or similar constituent elements.

DETAILED DESCRIPTION

Figure 1:
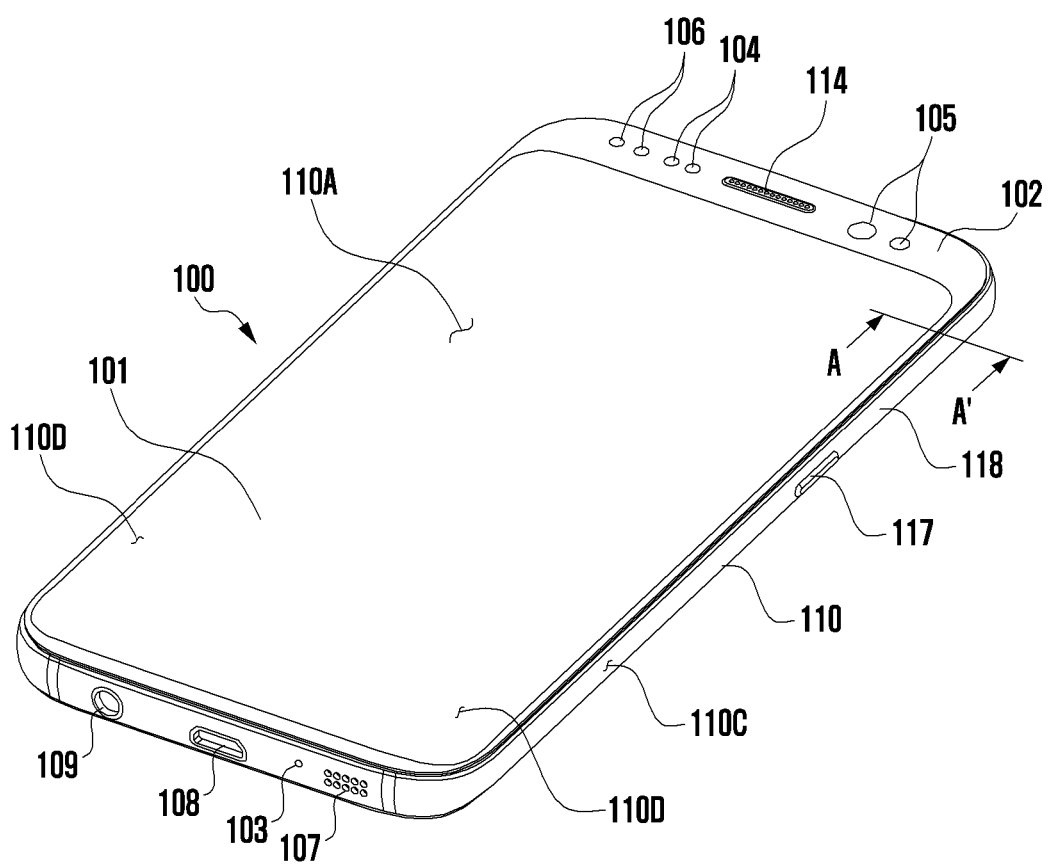
FIG. 1 is a perspective view illustrating a front surface of an electronic device according to various embodiments of the disclosure.
Figure 2:
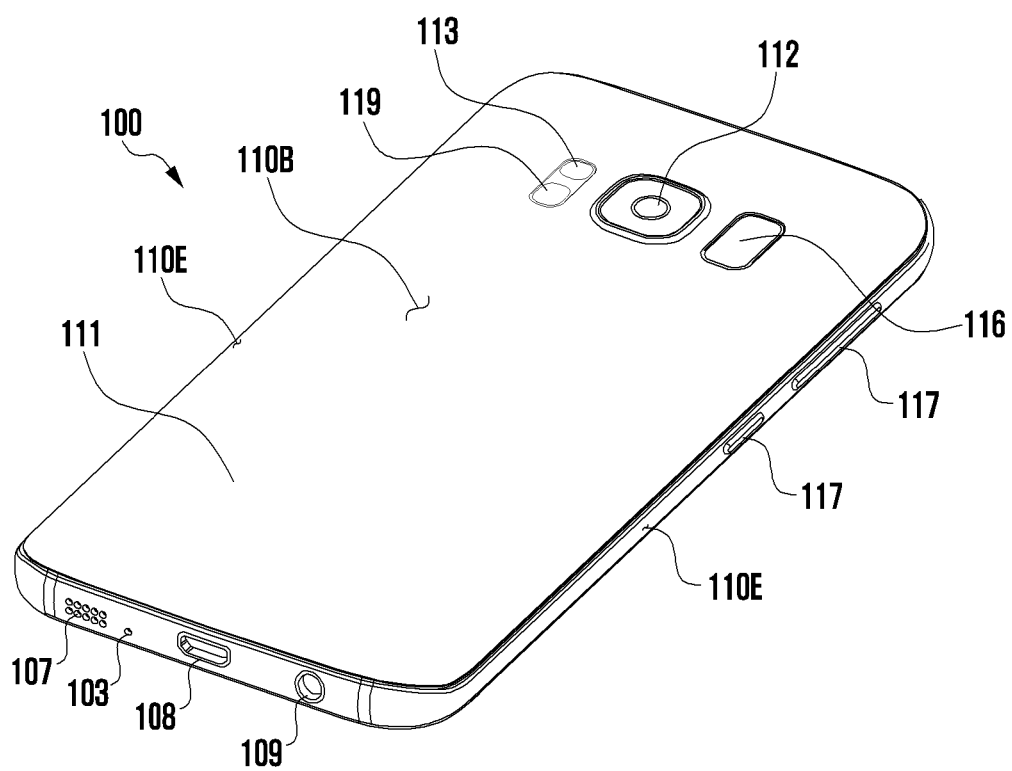
FIG. 2 is a perspective view illustrating a rear surface of the electronic device of FIG. 1 according to various embodiments of the disclosure.

FIG. 1 is a perspective view illustrating a front surface of a mobile electronic device according to an embodiment of the disclosure. FIG. 2 is a perspective view illustrating a rear surface of the electronic device of FIG. 1 according to an embodiment of the disclosure.

Referring to FIGS. 1 and 2, according to an embodiment, an electronic device 100 may include a housing 110 that includes a first surface (or front surface) 110A, a second surface (or rear surface) 110B, and a lateral surface 110C that surrounds a space between the first surface 110A and the second surface 110B. According to another embodiment, the housing 110 may refer to a structure that forms a part of the first surface 110A, the second surface 110B, and the lateral surface 110C. According to an embodiment, the first surface 110A may be formed of a front plate 102 (e.g., a glass plate or polymer plate coated with a variety of coating layers) at least a part of which is substantially transparent. The second surface 110B may be formed of a rear plate 111 which is substantially opaque. The rear plate 111 may be formed of, for example, coated or colored glass, ceramic, polymer, metal (e.g., aluminum, stainless steel (STS), or magnesium), or any combination thereof. The lateral surface 110C may be formed of a lateral bezel structure (or "lateral member") 118 which is combined with the front plate 102 and the rear plate 111 and includes a metal and/or polymer. The rear plate 111 and the lateral bezel structure 118 may be integrally formed and may be of the same material (e.g., a metallic material such as aluminum).

In the shown embodiment, the front plate 102 may include two first regions 110D disposed at long edges thereof, respectively, and bent and extended seamlessly from the first surface 110A toward the rear plate 111. In the shown embodiment, the rear plate 111 may include two second regions 110E disposed at long edges thereof, respectively, and bent and extended seamlessly from the second surface 110B toward the front plate 102 (refer to FIG. 2). In various embodiments, the front plate 102 (or the rear plate 111) may include only one of the first regions 110D (or of the second regions 110E). In various embodiments, the first regions 110D or the second regions 110E may be omitted in part. In the embodiments, when viewed from a lateral side of the electronic device 100, the lateral bezel structure 118 may have a first thickness (or width) on a lateral side where one of the first regions 110D or one of the second regions 110E is not included, and may have a second thickness, being less than the first thickness, on another lateral side where one of the first regions 110D or one of the second regions 110E is included.

According to an embodiment, the electronic device 100 may include at least one of a display 101, audio modules 103, 107 and 114, sensor modules 104, 116 and 119, camera modules 105, 112 and 113, key input devices 117, a light emitting device 106, and connector holes 108 and 109. In various embodiments, the electronic device 100 may omit at least one (e.g., the key input devices 117 or the light emitting device 106) of the above components, or may further include other components.

The display 101 may be exposed through a substantial portion of the front plate 102, for example. In various embodiments, at least a part of the display 101 may be exposed through the front plate 102 that forms the first surface 110A and the first regions 110D. In various embodiments, outlines (i.e., edges and corners) of the display 101 may have substantially the same form as those of the front plate 102. In another embodiment (not shown), the spacing between the outline of the display 101 and the outline of the front plate 102 may be substantially unchanged in order to enlarge the exposed area of the display 101.

In another embodiment (not shown), a recess or opening may be formed in a portion of a display area of the display 101 to accommodate at least one of the audio modules (e.g., the audio module 114), the sensor module 104, the camera module 105, and the light emitting device 106. In another embodiment (not shown), at least one of the audio modules (e.g., the audio module 114), the sensor module 104, the camera module 105, the sensor module 116 (e.g., a fingerprint sensor), and the light emitting device 106 may be disposed on the back of the display area of the display 101. In another embodiment (not shown), the display 101 may be combined with, or adjacent to, a touch sensing circuit, a pressure sensor capable of measuring the touch strength (pressure), and/or a digitizer for detecting a stylus pen. In various embodiments, at least a part of the sensor modules 104 and 119 and/or at least a part of the key input devices 117 may be disposed in one of the first regions 110D and/or one of the second regions 110E.

The audio modules 103, 107 and 114 may correspond to a microphone hole (e.g., the audio module 103) and speaker holes (e.g., the audio modules 107 and 114). The microphone hole may contain a microphone disposed therein for acquiring external sounds and, in a case, contain a plurality of microphones to sense a sound direction. The speaker holes may be classified into an external speaker hole and a call receiver hole. In various embodiments, the microphone hole and the speaker holes may be implemented as a single hole, or a speaker (e.g., a piezo speaker) may be provided without the speaker holes.

The sensor modules 104, 116 and 119 may generate electrical signals or data corresponding to an internal operating state of the electronic device 100 or to an external environmental condition. The sensor modules 104, 116 and 119 may include a first sensor module (e.g., the sensor module 104) (e.g., a proximity sensor) and/or a second sensor module (e.g., a fingerprint sensor) disposed on the first surface 110A of the housing 110, and/or a third sensor module (e.g., the sensor module 119) (e.g., a heart rate monitor (HRM) sensor) and/or a fourth sensor module (e.g., the sensor module 116) (e.g., a fingerprint sensor) disposed on the second surface 110B of the housing 110. The fingerprint sensor may be disposed on the second surface 110B as well as the first surface 110A (e.g., the display 101) of the housing 110. The electronic device 100 may further include at least one of a gesture sensor, a gyro sensor, an air pressure sensor, a magnetic sensor, an acceleration sensor, a grip sensor, a color sensor, an infrared (IR) sensor, a biometric sensor, a temperature sensor, a humidity sensor, or an illuminance sensor.

The camera modules 105, 112 and 113 may include a first camera device (e.g., the camera module 105) disposed on the first surface 110A of the electronic device 100, and a second camera device (e.g., the camera module 112) and/or a flash (e.g., the camera module 113) disposed on the second surface 110B. The camera module 105 or the camera module 112 may include one or more lenses, an image sensor, and/or an image signal processor. The flash may include, for example, a light emitting diode or a xenon lamp. In various embodiments, two or more lenses (infrared cameras, wide angle and telephoto lenses) and image sensors may be disposed on one side of the electronic device 100.

The key input devices 117 may be disposed on the lateral surface 110C of the housing 110. In another embodiment, the electronic device 100 may not include some or all of the key input devices 117 described above, and the key input devices 117 which are not included may be implemented in another form such as a soft key on the display 101. In various embodiments, the key input devices 117 may include the sensor module 116 disposed on the second surface 110B of the housing 110.

The light emitting device 106 may be disposed on the first surface 110A of the housing 110, for example. For example, the light emitting device 106 may provide status information of the electronic device 100 in an optical form. In various embodiments, the light emitting device 106 may provide a light source associated with the operation of the camera module 105. The light emitting device 106 may include, for example, a light emitting diode (LED), an infrared (IR) LED, or a xenon lamp.

The connector holes 108 and 109 may include a first connector hole (e.g., the connector hole 108) adapted for a connector (e.g., a universal serial bus (USB) connector) for transmitting and receiving power and/or data to and from an external electronic device, and/or a second connector hole (e.g., the connector hole 109) adapted for a connector (e.g., an earphone jack) for transmitting and receiving an audio signal to and from an external electronic device.

Figure 3:
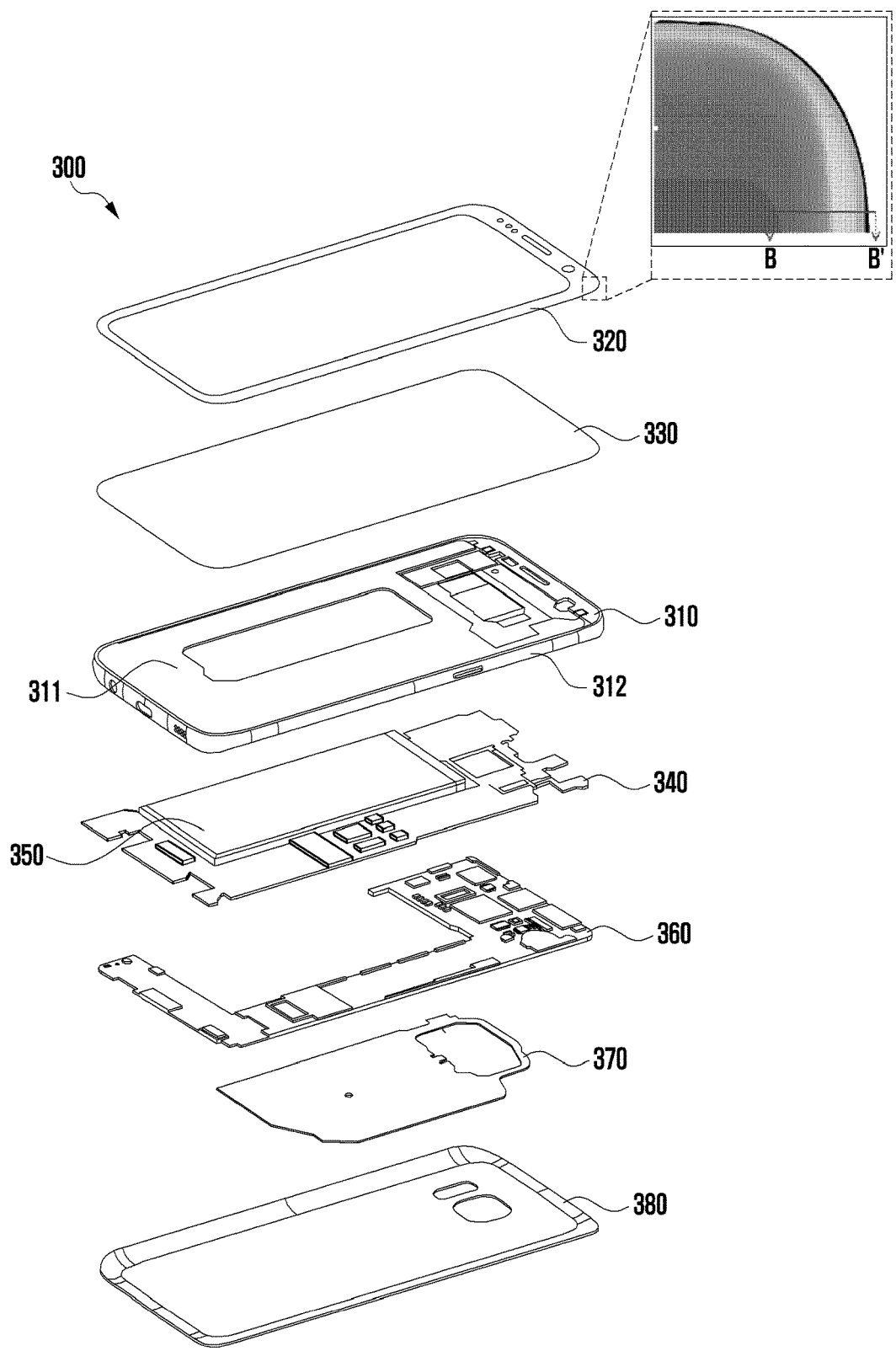
FIG. 3 is an exploded perspective view illustrating the electronic device of FIG. 1 according to various embodiments of the disclosure.

FIG. 3 is an exploded perspective view illustrating the electronic device of FIG. 1 according to an embodiment of the disclosure.

Referring to FIG. 3, an electronic device 300 (e.g., the electronic device 100 of FIG. 1) may include a lateral bezel structure 310, a first support member 311 (e.g., a bracket), a front plate 320, a display 330 (e.g., the display 101), a printed circuit board (PCB) 340, a battery 350, a second support member 360 (e.g., a rear case), an antenna 370, and a rear plate 380. In various embodiments, the electronic device 300 may omit at least one (e.g., the first support member 311 or the second support member 360) of the above components or may further include another component. Some components of the electronic device 300 may be the same as or similar to those of the electronic device 100 shown in FIG. 1 or FIG. 2, thus, descriptions thereof are omitted below.

The first support member 311 is disposed inside the electronic device 300 and may be connected to, or integrated with, the lateral bezel structure 310. The first support member 311 may be formed of, for example, a metallic material and/or a non-metal (e.g., polymer) material. The first support member 311 may be combined with the display 330 at one side thereof and also combined with the PCB 340 at the other side thereof. On the PCB 340, a processor, a memory, and/or an interface may be mounted. The processor may include, for example, one or more of a central processing unit (CPU), an application processor (AP), a graphics processing unit (GPU), an image signal processor (ISP), a sensor hub processor, or a communications processor (CP).

The memory may include, for example, volatile memory or non-volatile memory.

The interface may include, for example, a high definition multimedia interface (HDMI), a USB interface, a secure digital (SD) card interface, and/or an audio interface. The interface may electrically or physically connect the electronic device 300 with an external electronic device and may include a USB connector, an SD card/multimedia card (MMC) connector, or an audio connector.

The battery 350 is a device for supplying power to at least one component of the electronic device 300, and may include, for example, a non-rechargeable primary battery, a rechargeable secondary battery, or a fuel cell. At least a part of the battery 350 may be disposed on substantially the same plane as the PCB 340. The battery 350 may be integrally disposed within the electronic device 300, and may be detachably disposed from the electronic device 300.

The antenna 370 may be disposed between the rear plate 380 and the battery 350. The antenna 370 may include, for example, a near field communication (NFC) antenna, a wireless charging antenna, and/or a magnetic secure transmission (MST) antenna. The antenna 370 may perform short-range communication with an external device, or transmit and receive power required for charging wirelessly. An antenna structure may be formed by a part or combination of the lateral bezel structure 310 and/or the first support member 311.

According to various embodiments, the front plate 320 may include a transparent plate (e.g., a glass plate or a transparent cover). When viewed from the outside, gradation depiction may be applied in which, as at least a partial region (e.g., an illustrated enlarged region) approaches a peripheral region, a value varies gradually. According to an embodiment, the gradation depiction region may be applied to a region (e.g., a black matrix (BM) region) other than a display region that can be seen through the front plate 320 formed of a transparent material. According to an embodiment, the front plate 320 may include a decorative structure (e.g., a decorative structure 400 of FIG. 4) in which multilayer dots are formed on an inner surface thereof in a repetitive pattern for the gradation depiction. According to an embodiment, the multilayer dots may be formed using a silk screen printing method, which can be made inexpensive compared to a laser printing method or an inkjet method.

Figure 4:
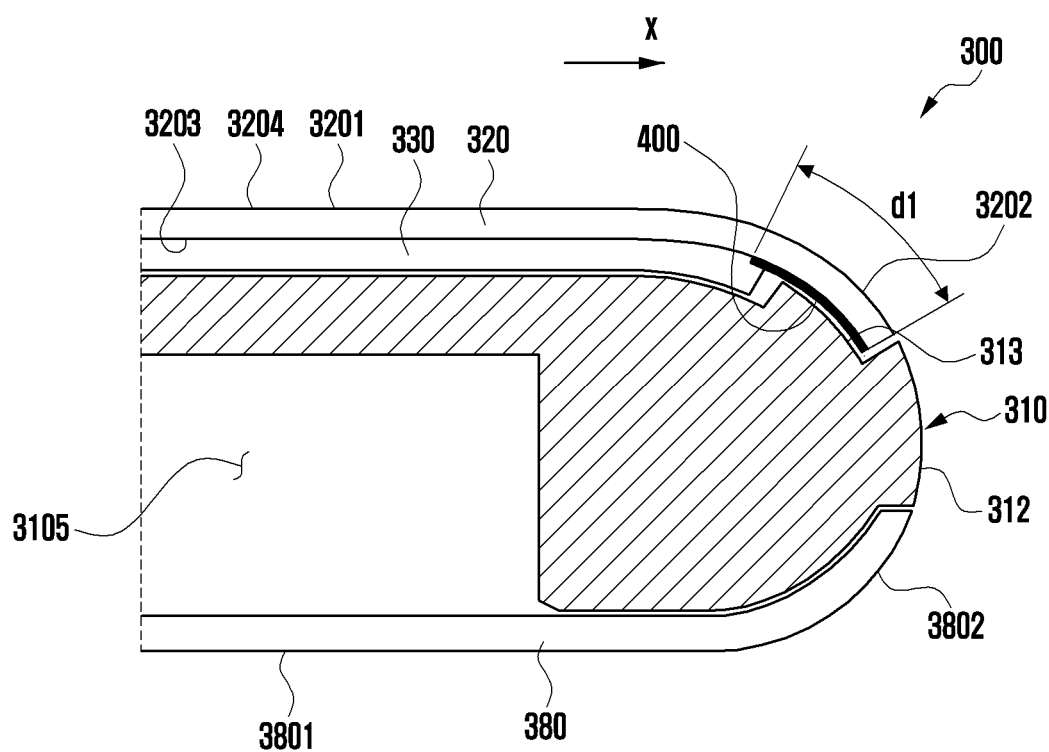
FIG. 4 is a sectional view of the electronic device taken along ling A-A' of FIG. 1 according to various embodiments of the disclosure.

FIG. 4 is a sectional view of an electronic device 300 taken along ling A-A' of FIG. 1 according to various embodiments of the disclosure.

An electronic device 300 of FIG. 4 may be similar to the electronic device 100 of FIG. 1 in at least some aspects, but other embodiments of the electronic device may also be included.

Referring to FIG. 4, the electronic device 300 may include a first plate 320 (e.g., a transparent plate, a front plate, or a transparent cover) directed in a first direction (e.g., a direction of the front plate 320 of FIG. 3), a second plate 380 facing away from the first plate 320, and a housing structure 310 (e.g., a lateral bezel structure) having a lateral member 312 that surrounds a space 3105 between the first plate 320 and the second plate 380. According to an embodiment, at least a part of the lateral member 312 may be exposed to the outside of the electronic device 300. According to an embodiment, at least a part of the housing structure may be formed of a metal material. According to an embodiment, at least a partial region of the first plate 320 may be formed of a transparent material. According to an embodiment, the first plate 320 may be formed of glass, sapphire, acryl, or a reinforced plastic.

According to various embodiments, the first plate 320 may include a plane section 3201 and a curve section 3202 that extends from the plane section 3201. According to an embodiment, the first plate 320 may include an inner surface 3203 that faces the space 3105 and an outer surface 3204 that faces away from the inner surface 3203. According to an embodiment, the electronic device 300 may include a decorative structure 400 that is disposed in a peripheral region d1 of the first plate 320 in the vicinity of a portion 313 of the housing structure 310. According to an embodiment, the decorative structure 400 may be disposed on the inner surface 3203 of the first plate 320, and be disposed to be visible from the outer surface 3204 of the first plate 320 formed of a transparent material.

According to various embodiments, when the first plate 320 is viewed from above, the decorative structure 400 may be disposed at a position at which the curve section 3202 of the first plate 320 is included. In another embodiment, when the first plate 320 is viewed from above, the decorative structure 400 may be disposed in a region where the plane section 3201 and the curve section 3202 are included at least in part. In another embodiment, when the first plate 320 is viewed from above, the decorative structure 400 may be disposed in a region where the curve section 3202 and a boundary portion between the curve section 3202 and the plane section 3201 are included. According to an embodiment, the decorative structure 400 may be disposed up to a position at which the plane section 3201 and/or the curve section 3202 of the first plate 320 overlaps at least a partial region of a display 330. In this case, the decorative structure 400 may be disposed up to an inactive region (e.g., a black matrix (BM) region) of the display 330 among the plane section 3201 and/or the curve section 3202 of the first plate 320.

According to various embodiments, the decorative structure 400 may be disposed in at least a partial region of the second plate 380 between the second plate 380 and the housing structure 310. In this case, the second plate 380 may also be formed of glass, sapphire, acryl, or a reinforced plastic that is transparent. According to an embodiment, the second plate 380 may include a plane section 3801 and a curve section 3802 that extends from the plane section 3801. According to an embodiment, the decorative structure 400 may be disposed on both or at least one of the first plate 320 and the second plate 380.

Although not illustrated, a waterproof member (not illustrated) may be interposed between the first plate 320 and/or the second plate 380 and the housing structure 310. According to an embodiment, at least a part of the waterproof member may be disposed between the decorative structure 400 and the housing structure 310. According to an embodiment, the waterproof member may include a waterproof tape and/or a waterproof sealing material, and be adhered along an edge of the electronic device 300, thereby being able to prevent moisture from permeating the inner space 3105 of the housing structure 310.

Hereinafter, a configuration of the decorative structure 400 will be described in detail.

Figure 5:
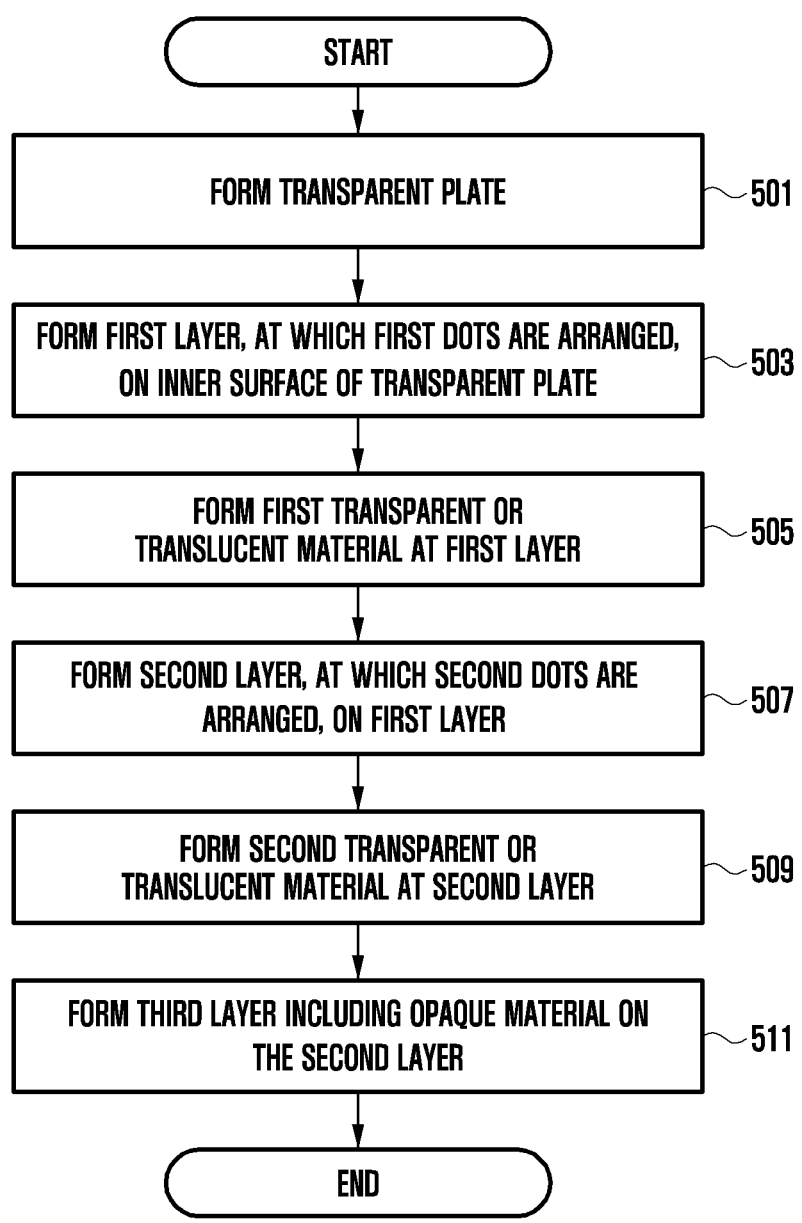
FIG. 5 is a process flow chart illustrating a manufacturing process of a decorative structure according to various embodiment of the disclosure.
Figure 6:
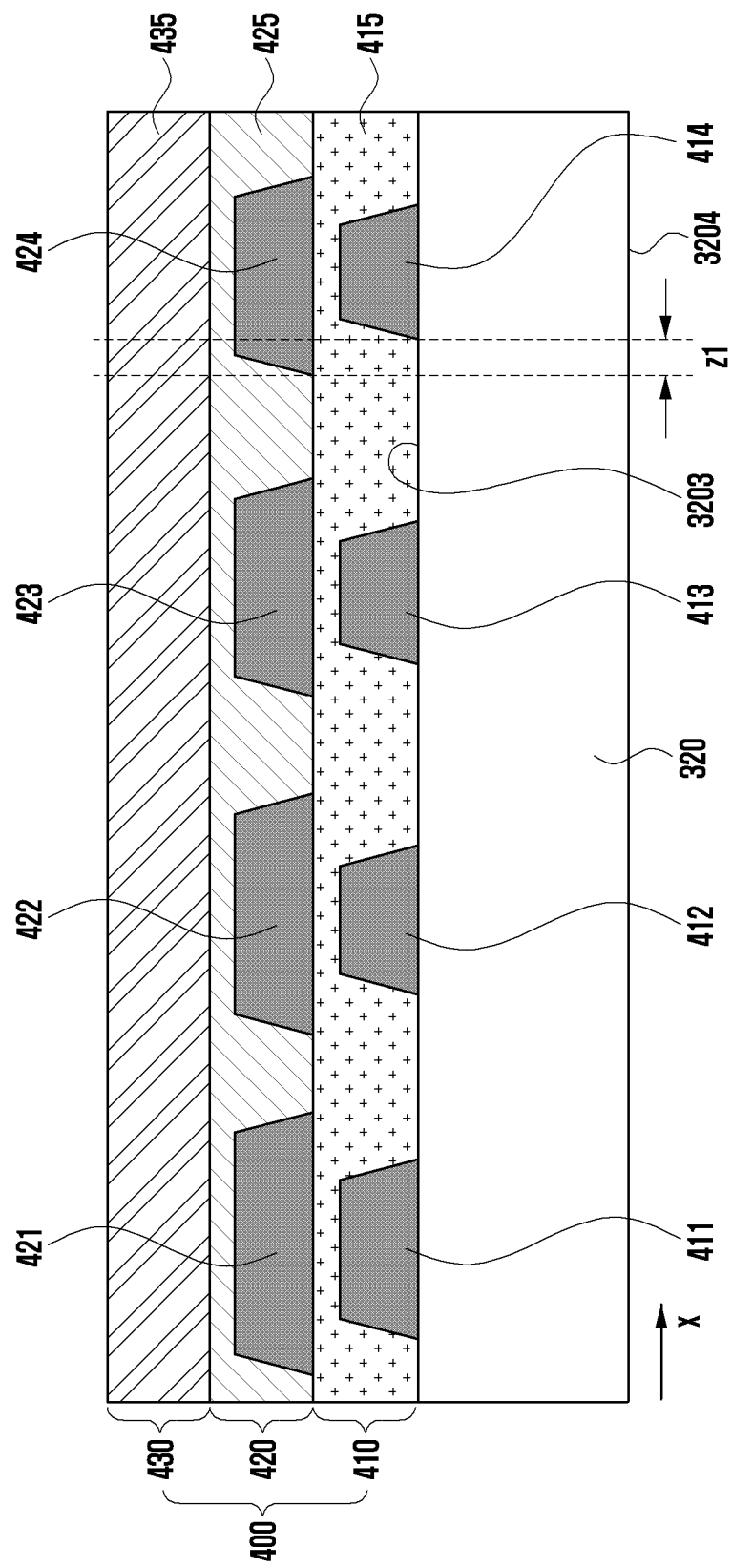
FIG. 6 is a sectional view of a decorative structure taken along line B-B' of FIG. 3 according to various embodiment of the disclosure.

FIG. 5 is a process flow chart illustrating a manufacturing process of the decorative structure 400 according to various embodiment of the disclosure. FIG. 6 is a sectional view of the decorative structure 400 taken along line B-B' of FIG. 3 according to various embodiment of the disclosure.

The order of steps presented in FIG. 5 may be at least partly changed, or some of the steps may be omitted.

Referring to FIGS. 5 and 6, in step 501, a transparent plate 320 (e.g., the first plate 320 of FIG. 4) may be provided. According to an embodiment, the transparent plate 320 may be coupled with a housing structure (e.g., the housing structure 310 of FIG. 4) of an electronic device (e.g., the electronic device 300 of FIG. 4), and be formed of glass, sapphire, acryl, or a reinforced plastic that is transparent.

According to various embodiments, in step 503, a first layer 410 may be formed on an inner surface 3203 of the transparent plate 320. According to an embodiment, the first layer 410 may include first dots 411, 412, 413, and 414 formed in a plurality of repetitive patterns. According to an embodiment, the first dots 411, 412, 413, and 414 may be formed by a silk screen method. According to an embodiment, the first dots 411, 412, 413, and 414 may be formed at regular intervals, and be disposed in such a way that sizes thereof are gradually reduced toward a surrounding direction (an x direction) of the transparent plate 320. According to an embodiment, the first dots 411, 412, 413, and 414 may include a color layer having a black hue. In another embodiment, the first dots 411, 412, 413, and 414 may include various other hues other than the black hue.

According to various embodiments, in step 505, a first transparent or translucent material 415 may be formed on the first layer 410 such that the first dots 411, 412, 413, and 414 are included. According to an embodiment, the first transparent or translucent material 415 may include a color coating layer having a higher value than the first dots 411, 412, 413, and 414. According to an embodiment, the first transparent or translucent material 415 may determine a hue of the decorative structure 400 projected through the transparent plate 320. According to an embodiment, the first transparent or translucent material 415 may include a material, such as UV, urethane, a baking paint, an SF paint, or a water paint, of which a coating layer can be formed in the full range in which a curing reaction takes place according to a material and an environment. According to an embodiment, the first transparent or translucent material 415 may include a fluid paint such as a resin, a solvent, a pigment/dye, or an additive. According to an embodiment, the first transparent or translucent material 415 may be formed in a single layer or multiple layers according to a material and a product. According to an embodiment, a paint in which an organic/inorganic pigment, an organic dye, silver, or pearl is include may be used for a hue of the first transparent or translucent material 415. According to an embodiment, the first transparent or translucent material 415 may be formed through a slit coating method and a UV curing process.

According to various embodiments, in step 507, a second layer 420 may be formed on the first layer 410. According to an embodiment, the second layer 420 may include second dots 421, 422, 423, and 424 formed a plurality of repetitive patterns. According to an embodiment, the second dots 421, 422, 423, and 424 may be formed by a silk screen method. According to an embodiment, the second dots 421, 422, 423, and 424 may be formed at regular intervals, and be disposed in such a way that sizes thereof are gradually reduced toward the surrounding direction (the x direction) of the transparent plate 320. According to an embodiment, the second dots 421, 422, 423, and 424 may include a color layer having a black hue. In another embodiment, the second dots 421, 422, 423, and 424 may include various other hues other than the black hue. According to an embodiment, the first dots 411, 412, 413, and 414 and the second dots 421, 422, 423, and 424 may have the same black hue or hues different from each other.

According to various embodiments, when the transparent plate 320 is viewed from above, a unit dot for the first dots 411, 412, 413, and 414 and a unit dot for the second dots 421, 422, 423, and 424 may be correspondingly disposed such that at least parts thereof overlap each other. According to an embodiment, the unit dot for the first dots 411, 412, 413, and 414 may have a first size, and when the transparent plate 320 is viewed from above, the unit dot for the second dots 421, 422, 423, and 424 may have a second size larger than the first size. According to an embodiment, when the transparent plate 320 is viewed from above, the second dots 421, 422, 423, and 424 may have larger offset values z1 than the first dots 411, 412, 413, and 414. Therefore, when the transparent plate 320 is viewed from above, the second dots 421, 422, 423, and 424 may be at least partly covered by the first dots 411, 412, 413, and 414, and be at least partly projected to be visible through the transparent plate 320.

According to various embodiments, as illustrated, the first dots 411, 412, 413, and 414 and the second dots 421, 422, 423, and 424 are configured such that four unit dots disposed at regular intervals are correspondingly disposed in a vertical direction, but not limited thereto. For example, more dots than the above number may be disposed in the same way according to a size of a gradation depiction region or a shape of the transparent plate 320.

According to various embodiments, in step 509, a second transparent or translucent material 425 may be formed at the second layer 420 so as to include the second dots 421, 422, 423, and 424. According to an embodiment, the second transparent or translucent material 425 may include a mirror silver layer having a higher value than the second dots 421, 422, 423, and 424. According to an embodiment, the mirror silver layer may be formed of a mirror silver ink by a screen printing method. In another embodiment, the second transparent or translucent material 425 may include a deposited layer having a higher value (lightness) than the second dots 421, 422, 423, and 424. According to various embodiments, the second transparent or translucent material 425 is a layer that reflects light incident through the first transparent or translucent material 415, and may provide a texture of a metal material. A laminating method of the second transparent or translucent material 425 may include an E-beam evaporation method, a physical vapor deposition (PVD) method, or a chemical vapor deposition (CVD) method. According to an embodiment, at least one of a Sn-based material, a Ti-based material, a Cr-based material, or an Al-based material may be used for the second transparent or translucent material 425. According to an embodiment, the second transparent or translucent material 425 may include at least one of $TiO_2$, TiN, TiCN, $SiO_2$, $Al_2O_3$, $ZrO_2$, $Ta_2O_5$, In, or $Nb_2O_5$. According to an embodiment, at least two deposition materials may be alternately deposited for the second transparent or translucent material 425. According to an embodiment, at least two deposition materials may be mixed to obtain a first deposition material presenting a first refractive index and a second deposition material presenting a second refractive index different from the first refractive index, and these two deposition materials may be alternately deposited for the second transparent or translucent material 425. For example, a refractive index of a silicon oxide film ($SiO_2$) is 1.4, a refractive index of a titanium oxide film ($TiO_2$) is 2.4, and a refractive index of an aluminum oxide film ($Al_2O_3$) is 1.7. Therefore, if the silicon oxide film ($SiO_2$) and the titanium oxide film ($TiO_2$) having a great difference in the refractive index are alternately deposited, the deposited layer can be applied very favorably to a ceramic pearl texture effect and anisotropic color reproduction.

According to various embodiments, in step 511, a third layer 430 including an opaque material 435 may be formed on the second layer 420. According to an embodiment, the opaque material 435 may be formed of at least one layer using an ink of a black hue. According to an embodiment, the opaque material 435 may be printed by a screen mask printing method, and then be cured by a heat-drying method.

Although not illustrated, after the first transparent or translucent material 415 of the first layer 410 is formed, a molding layer (e.g., a UV molding layer) formed of a transparent material may be disposed thereon. According to an embodiment, a material that facilitates formation and adhesion of the second transparent or translucent material 425 of the second layer 420 laminated on the molding layer may be used for the molding layer. According to an embodiment, the molding layer may be formed in a single layer or multiple layers. According to an embodiment, the molding layer may be formed by coating with an acryl-based resin, an olefin-based resin, a urethane-based resin, or other resins and a paint based on an UV or urethane curing method according to a curing method. According to an embodiment, at least one of a resin of chlorinated polyolefine (CPO) series (e.g., a CPO_C1 type primer), an acryl modified resin, and an UV curing resin may be used for the molding layer. According to an embodiment, the molding layer may be cured through a process of oven drying or natural drying, or an UV curing method.

Figure 7:
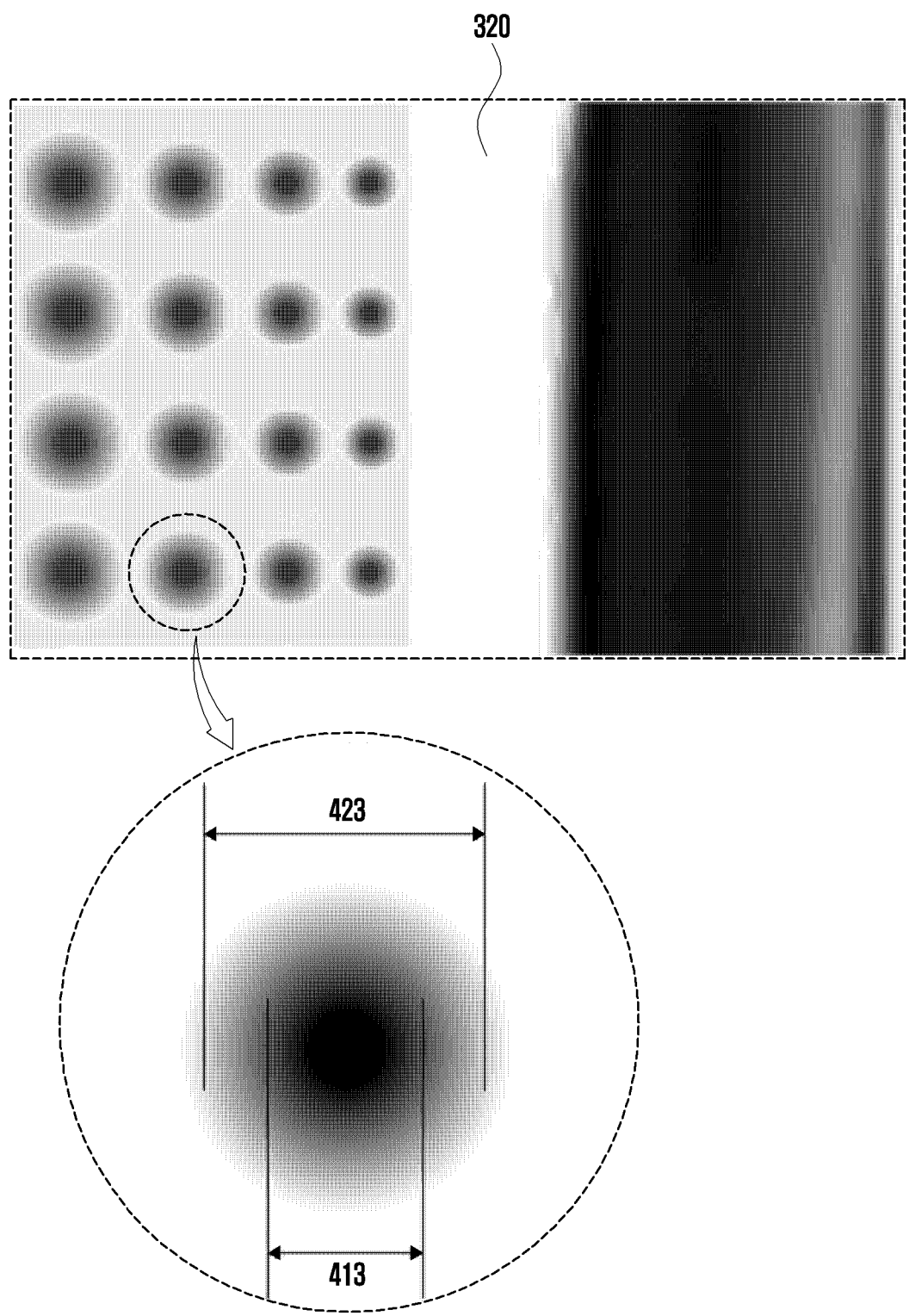
FIG. 7 is a view illustrating gradation depiction formed on a transparent plate modeled after the configuration of FIG. 6 according to various embodiments of the disclosure.

FIG. 7 is a view illustrating gradation depiction formed on a transparent plate 320 modeled after the configuration of FIG. 6 according to various embodiments of the disclosure.

Referring to FIG. 7, repetitive dots (e.g., the first dots 411, 412, 413, and 414 and the second dots 421, 422, 423, and 424 of FIG. 6) different from each other may be configured by a decorative structure (e.g., the decorative structure 400 of FIG. 6) formed in a multilayer structure such that the repetitive dots are vertically overlapped according to an exemplary embodiment of the disclosure such that soft gradation depiction is possible by preventing outlines thereof from being clearly distinguished with the naked eye even if the repetitive dots are formed by a silk screen method. For example, when a gradation decorative structure (e.g., the decorative structure 400 of FIG. 6) is viewed from an upper portion of the transparent plate 320, an effect that second dots (e.g., the second dots 421, 422, 423, and 424 of FIG. 6) are blocked and blurred by a first transparent or translucent material (e.g., the first transparent or translucent material 415 of FIG. 6) may take place, and an effect that first dots (e.g., the first dots 411, 412, 413, and 414 of FIG. 6) interact with second dots (e.g., the second dots 421, 422, 423, and 424 of FIG. 6) overlapped with the first dots and, for example, a first unit dot 413 is blurred from the center with respect to a second unit dot 423 may be provided.

FIGS. 8 to 12 are sectional views illustrating a decorative structure 400 according to various embodiments of the disclosure.

The decorative structure 400 according to various embodiments of the disclosure may be disposed in multiple layers such that dots formed in repetitive patterns are overlapped in a vertical direction, and saturation and/or illuminance of a gradation region presented by the decorative structure 400 may be variously changed using sizes of the dots, partial exclusion of the dots, addition of a dot layer, or a change in a refractive index of each layer.

Figure 8:
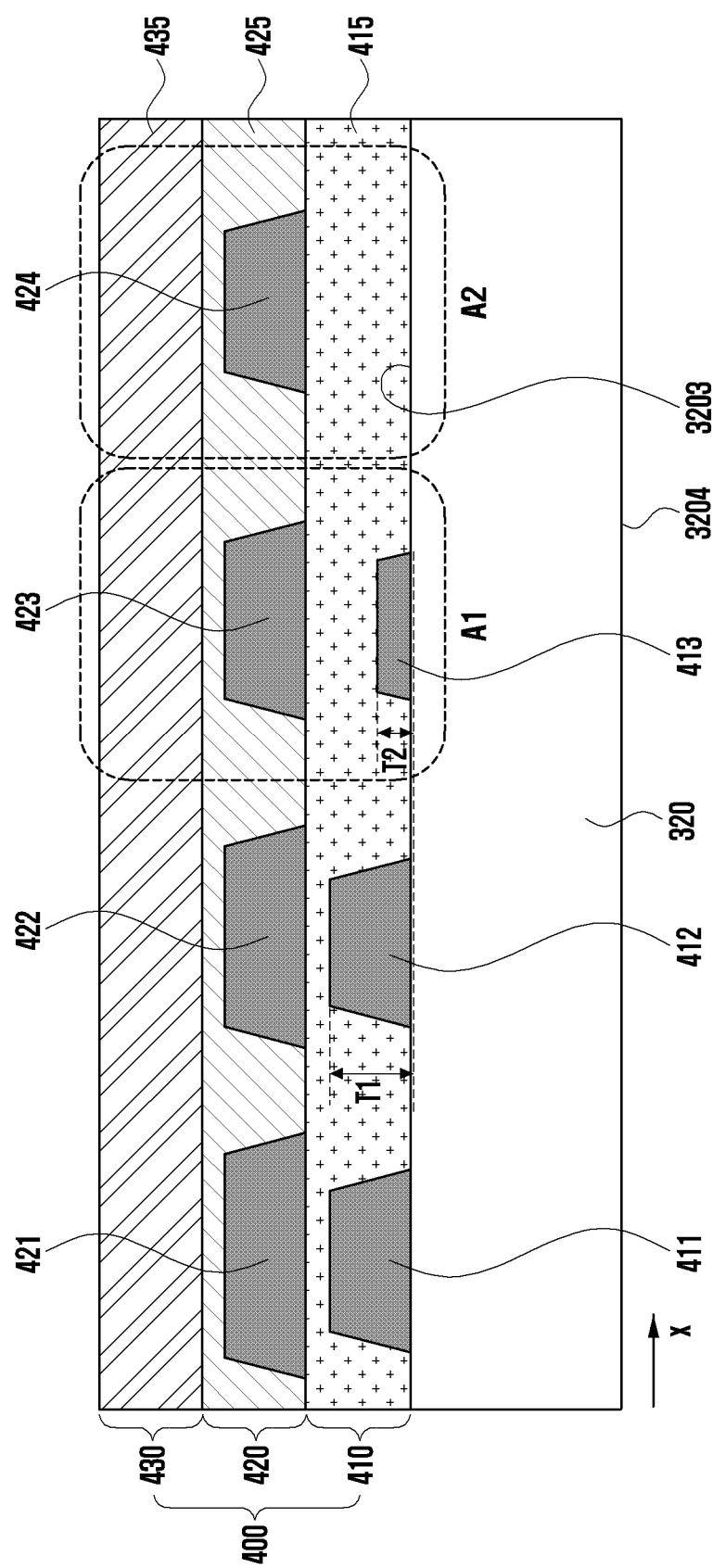
FIGS. 8 to 12 are sectional views illustrating a decorative structure according to various embodiments of the disclosure.

Referring to FIG. 8, a decorative structure 400 may include a first layer 410 including first dots 411, 412, and 413 disposed in a first transparent or translucent material 415, a second layer 420 including second dots 421, 422, 423, and 424 disposed in a second transparent or translucent material 425, and a third layer 430 including an opaque material 435, all of which are laminated on an inner surface 3203 of a transparent plate 320 in order. According to an embodiment, at least two 411 and 412 of the first dots 411, 412, and 413 disposed at the first layer 410 may have a first height T1. According to an embodiment, at least a part 413 of the first dots 411, 412, and 413 disposed at the first layer 410 may be formed to have a second height T2 lower than the first height T1 in a first region (a region A1). According to an embodiment, at least a part of the first dots 411, 412, and 413 may be removed from a second region (a region A2) of the first layer 410. According to an embodiment, at least one of the first dots 411, 412, and 413 disposed at the first layer 410 is formed at a different height or is removed, whereby the saturation of the gradation region caused by the dots projected from the transparent plate 320 can be variously changed.

Figure 9:
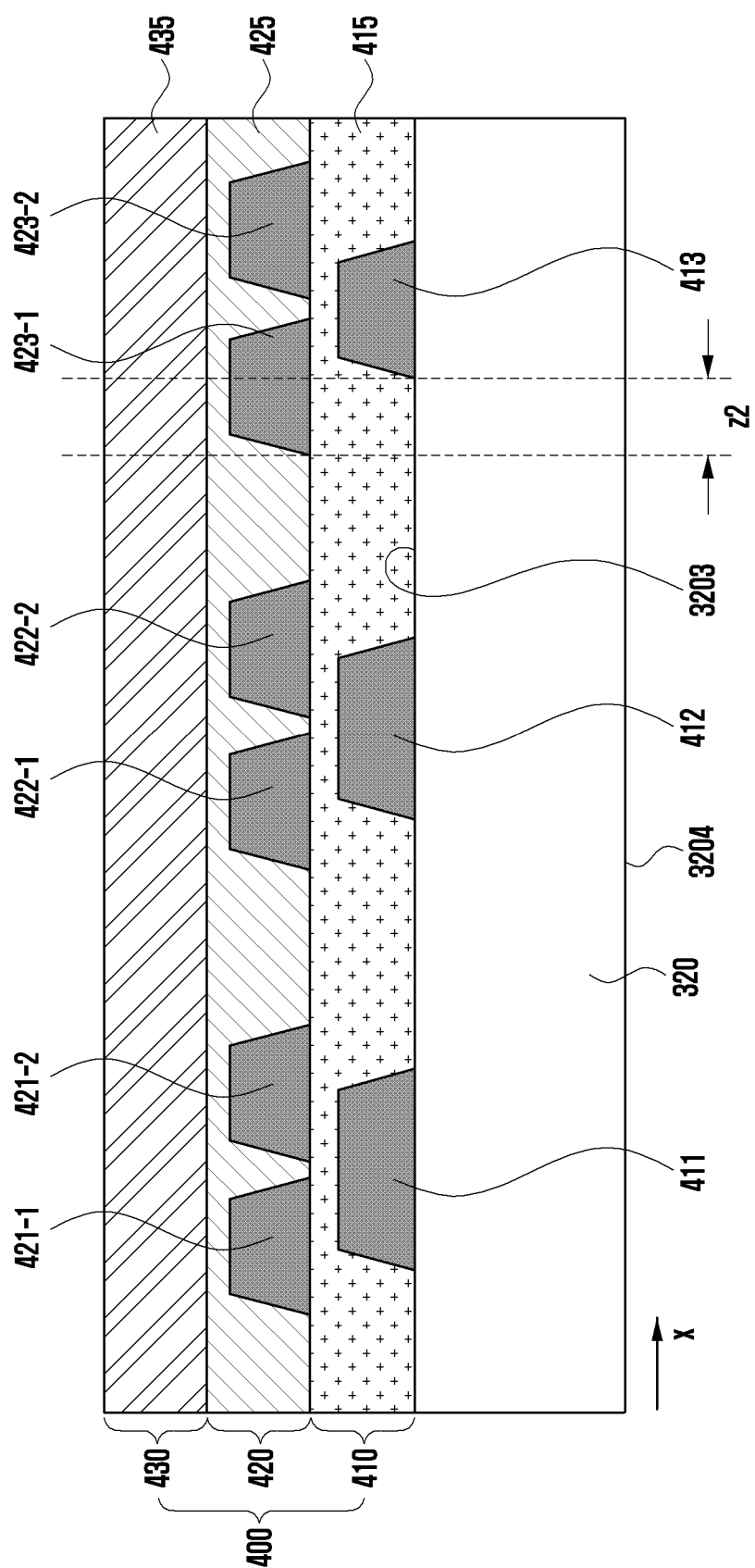

Referring to FIG. 9, a decorative structure 400 may include a first layer 410 including first dots 411, 412, and 413 disposed in a first transparent or translucent material 415, a second layer 420 including second dots 421-1, 421-2, 422-1, 422-2, 423-1, and 423-2 disposed in a second transparent or translucent material 425, and a third layer 430 including an opaque material 435, all of which are laminated on an inner surface 3203 of a transparent plate 320 in order. According to an embodiment, at least two 423-1 and 423-2 of the second dots 421-1, 421-2, 422-1, 422-2, 423-1, and 423-2 disposed at the second layer 420 may correspond to one unit dot 413 of the first dots 411, 412, and 413 disposed at the first layer 410. According to an embodiment, when the transparent plate 320 is viewed from above, the two dots 423-1 and 423-2 of the second layer 420 may have a larger offset value z2 than one dot 413 of the first layer 410. In another embodiment, three or more dots of the second layer 420 which correspond to one dot of the first layer 410 may be disposed. For example, the three or more dots of the second layer 420 which correspond to one dot of the first layer 410 may also be disposed to have a larger offset value than the one dot.

Figure 10:
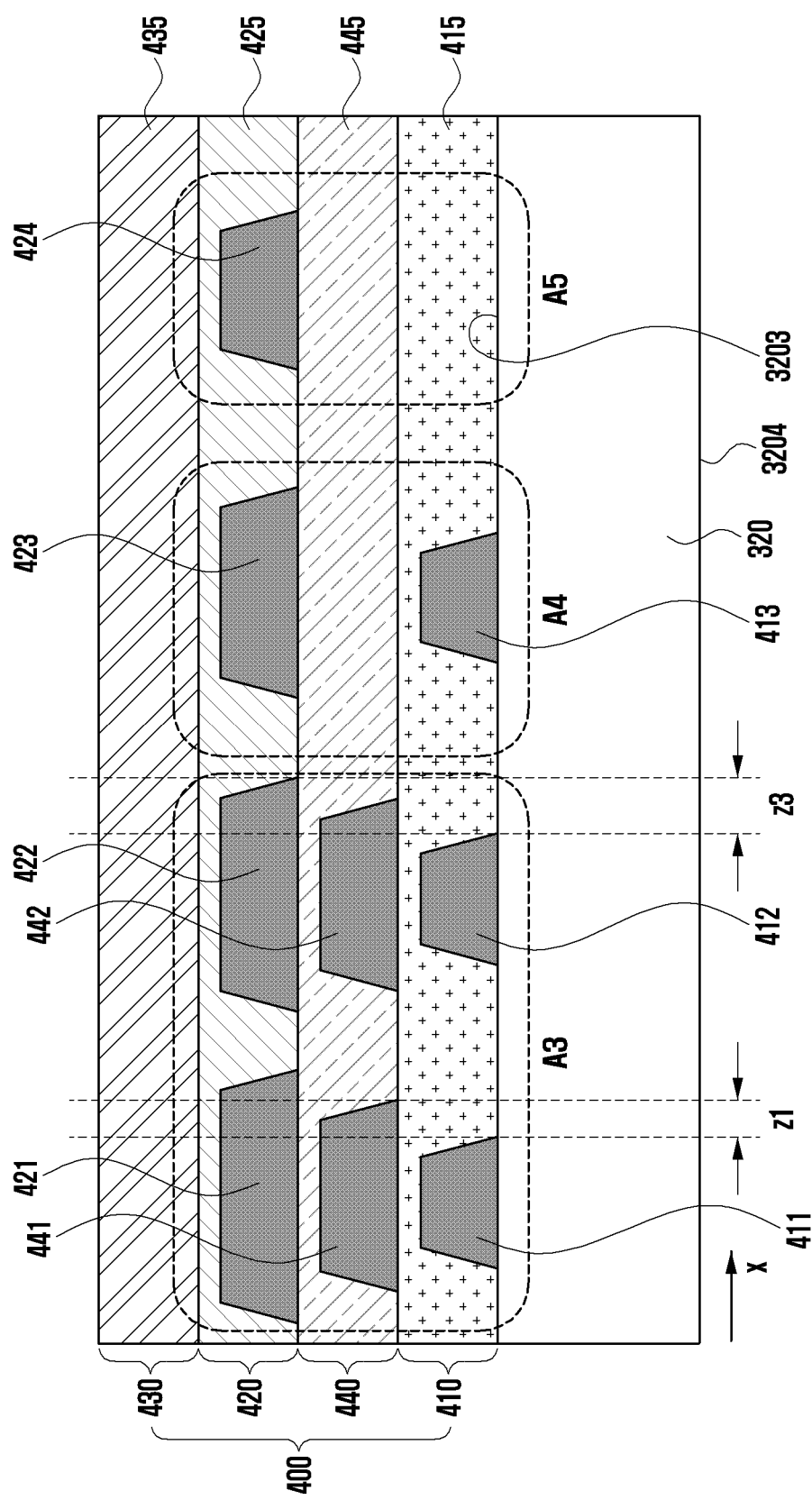

Referring to FIG. 10, a decorative structure 400 may include a first layer 410 including first dots 411, 412, and 413 disposed in a first transparent or translucent material 415, a second layer 420 including second dots 421, 422, 423, and 424 disposed in a second transparent or translucent material 425, and a third layer 430 including an opaque material 435, all of which are laminated on an inner surface 3203 of a transparent plate 320 in order. According to an embodiment, the decorative structure 400 may further include a fourth layer 440 that is interposed between the first layer 410 and the second layer 420 and includes third dots 441 and 442 disposed in a third transparent or translucent material 445. According to an embodiment, the third transparent or translucent material 445 may be formed of a material identical to or different from the first transparent or translucent material 415. According to an embodiment, the third transparent or translucent material 445 may be formed to have a lower value than the first transparent or translucent material 415.

According to various embodiments, when the transparent plate 320 is viewed from above, at least one dot 411 and 412 of the first layer 410, at least one dot 421 and 422 of the second layer 420, and at least one dot 441 and 442 of the fourth layer 440 may be disposed at positions that are at least partly overlapped in a third region (a region A3). For example, the at least one dot 421 and 422 disposed at the second layer 420 at the overlapped positions may be formed to have the largest sizes, the at least one dot 441 and 442 disposed at the fourth layer 440 may be formed to have sizes next to the dots 421 and 422, and the at least one dot 411 and 412 disposed at the first layer 410 may be formed to have the smallest sizes. Therefore, when the transparent plate 320 is viewed from above, the dot 441 of the fourth layer 440 may have a first offset value z1 greater than the first dot 411 disposed at the corresponding position of the first layer 410. According to an embodiment, when the transparent plate 320 is viewed from above, the dot 422 of the second layer 420 may have a second offset value z3 greater than the first dot 412 disposed at the corresponding position of the first layer 410. According to an embodiment, the second offset value z3 may be configured to be greater than the first offset value z1.

According to various embodiments, a gradation effect may be implemented by removing a dot of the fourth layer 440 in a fourth region (a region A4), and only by the dot 413 of the first layer 410 and the dot 423 of the second layer 420. According to an embodiment, a gradation effect may be implemented by removing a dot of the first layer 410 and a dot of the fourth layer 440 in a fifth region (a region A5) and allowing only the dot of the second layer 420 to be projected through the first transparent or translucent material 415 and the third transparent or translucent material 445 while having a diffusion effect.

Figure 11:
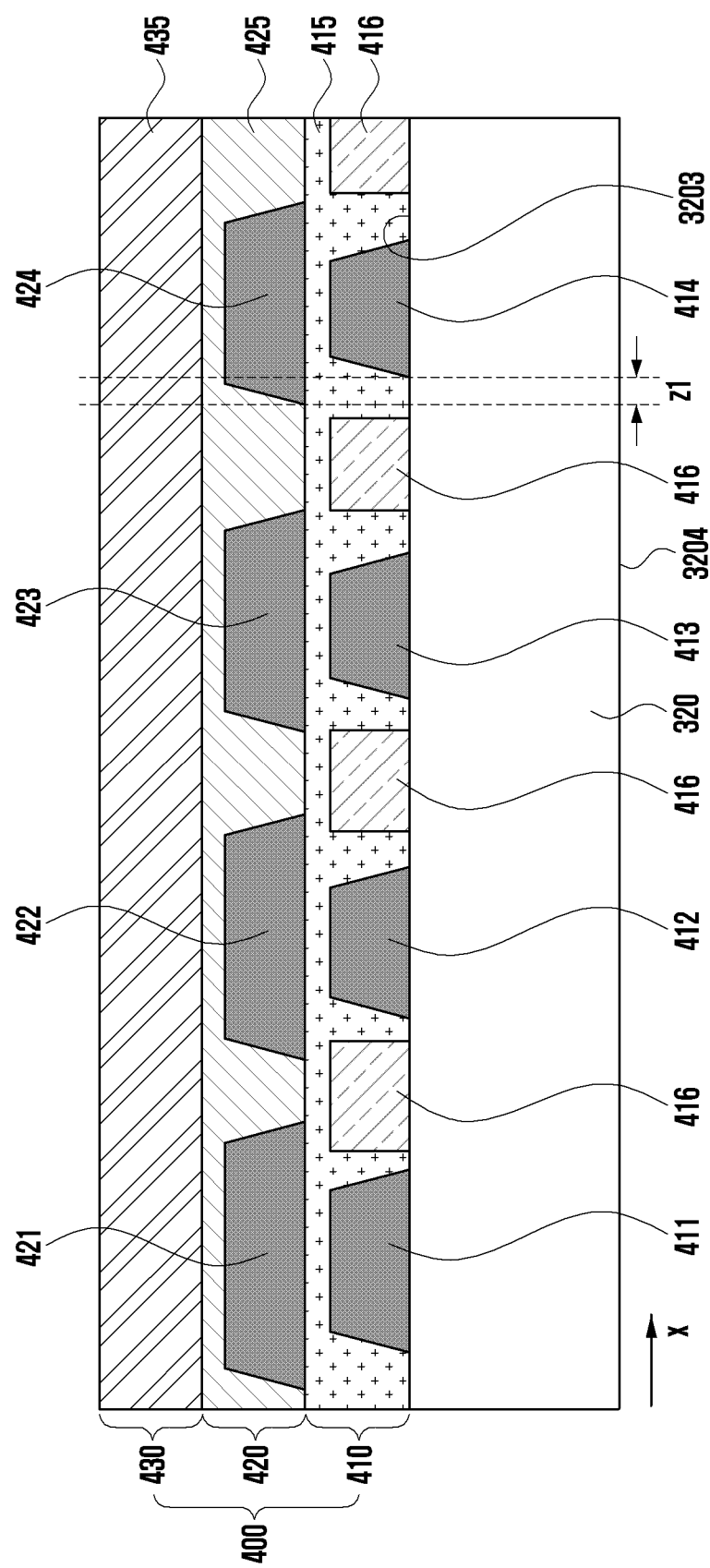

Referring to FIG. 11, a decorative structure 400 may include a first layer 410 including first dots 411, 412, 413, and 414 disposed in a first transparent or translucent material 415, a second layer 420 including second dots 421, 422, 423, and 424 disposed in a second transparent or translucent material 425, and a third layer 430 including an opaque material 435, all of which are laminated on an inner surface 3203 of a transparent plate 320 in order. According to an embodiment, fourth transparent or translucent materials 416 having a refractive index different from that of the first transparent or translucent material 415 may be disposed at the first layer 410. According to an embodiment, the fourth transparent or translucent materials 416 may include a color coating layer having a refractive index different from that of the first transparent or translucent material 415. According to an embodiment, the fourth transparent or translucent materials 416 are disposed between unit dots of the first dots 411, 412, 413, and 414 and refract incident light projected from the transparent plate 320 to the second layer 420 so as to differ partly, whereby saturation of a gradation region can be changed.

Figure 12:
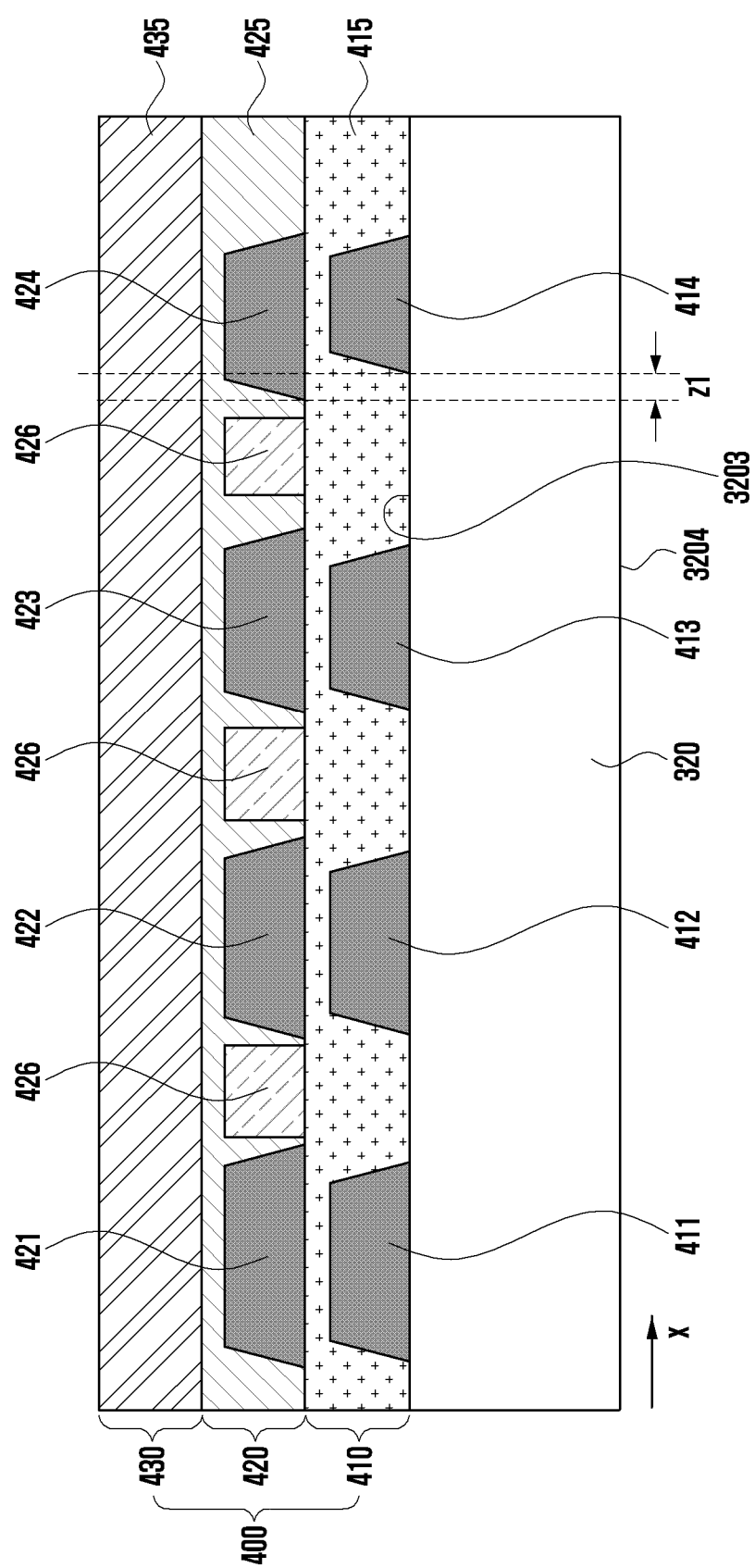

Referring to FIG. 12, a decorative structure 400 may include a first layer 410 including first dots 411, 412, 413, and 414 disposed in a first transparent or translucent material 415, a second layer 420 including second dots 421, 422, 423, and 424 disposed in a second transparent or translucent material 425, and a third layer 430 including an opaque material 435, all of which are laminated on an inner surface 3203 of a transparent plate 320 in order. According to an embodiment, fifth transparent or translucent materials 426 having a refractive index different from that of the second transparent or translucent material 425 may be disposed at the second layer 420. According to an embodiment, the fifth transparent or translucent materials 426 may include a deposited layer having reflectivity different from that of the second transparent or translucent material 425. According to an embodiment, the fifth transparent or translucent materials 426 are disposed between unit dots of the second dots 421, 422, 423, and 424 and reflect incident light projected from the transparent plate 320 at partly different angles, whereby illuminance of a gradation region can be changed. For example, in the case where light reflectivity of the second transparent or translucent material 425 is lower than that of the fifth transparent or translucent materials 426, a gradation effect that illuminance is relatively low may be presented.

Figure 13:
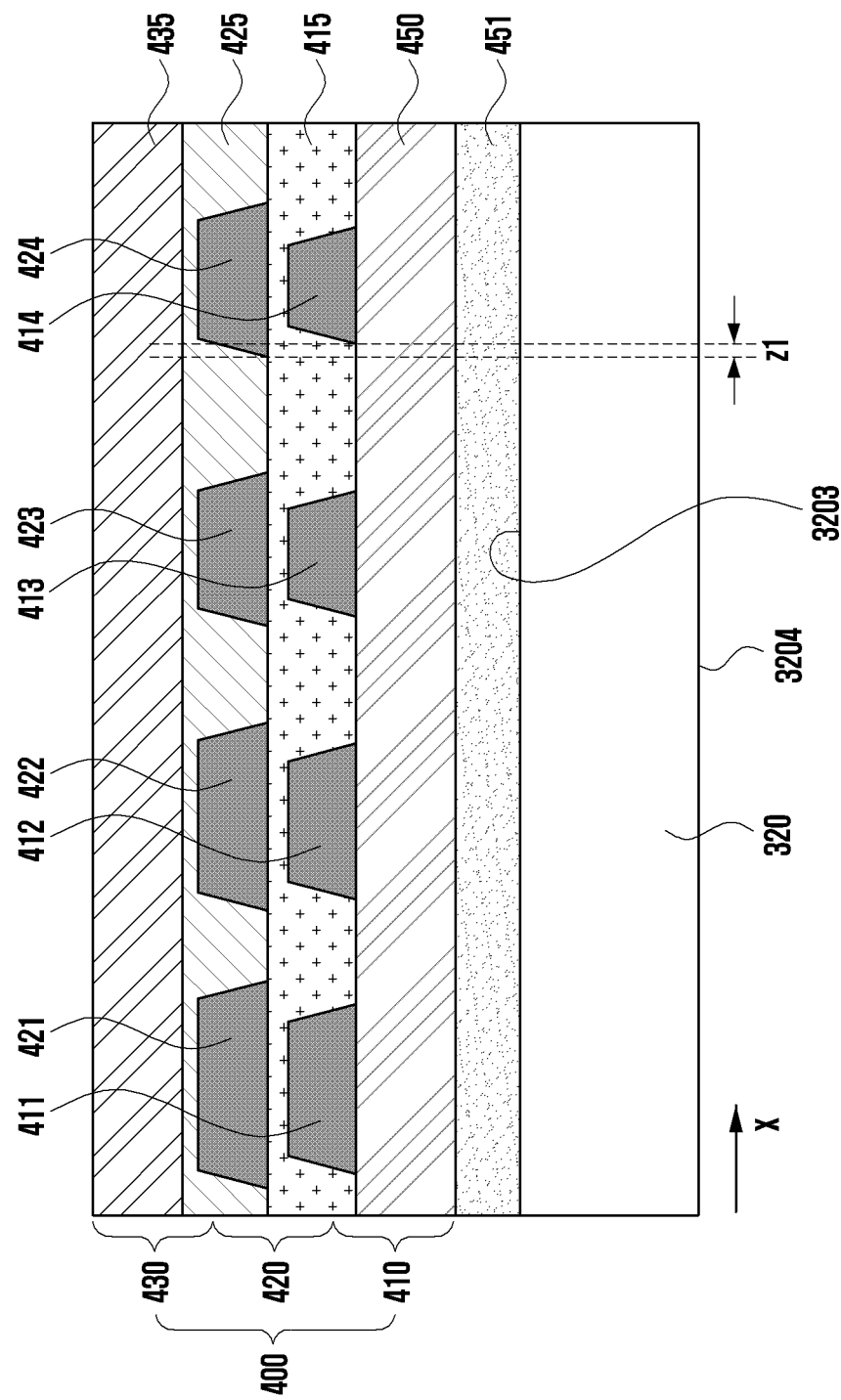
FIG. 13 is a sectional view illustrating a state in which a decorative structure according to various embodiments of the disclosure is formed on a printed film.

FIG. 13 is a sectional view illustrating a state in which a decorative structure 400 according to various embodiments of the disclosure is formed on a printed film 450.

Referring to FIG. 13, the decorative structure 400 may be formed on one surface of the printed film 450 (e.g., a base film) and, after the decorative structure 400 is entirely formed, the printed film 450 may be adhered to the inner surface 3203 of the transparent plate 320 using an adhesive layer 451 after a release layer (not illustrated) (e.g., release paper or a release film) is removed. According to an embodiment, the decorative structure 400 may include a first layer 410 including first dots 411, 412, 413, and 414 disposed in a first transparent or translucent material 415, a second layer 420 including second dots 421, 422, 423, and 424 disposed in a second transparent or translucent material 425, and a third layer 430 including an opaque material 435, all of which are laminated on the printed film 450 in order. According to an embodiment, the printed film 450 may be adhered to the inner surface 3203 of the transparent plate 320 using the adhesive layer 451 (e.g., an OCA layer). According to an embodiment, the printed film 450 may be formed of glass, a metal, a composite material, or a polymer material (e.g., polyethylene terephthalate (PET)).

Figure 14:
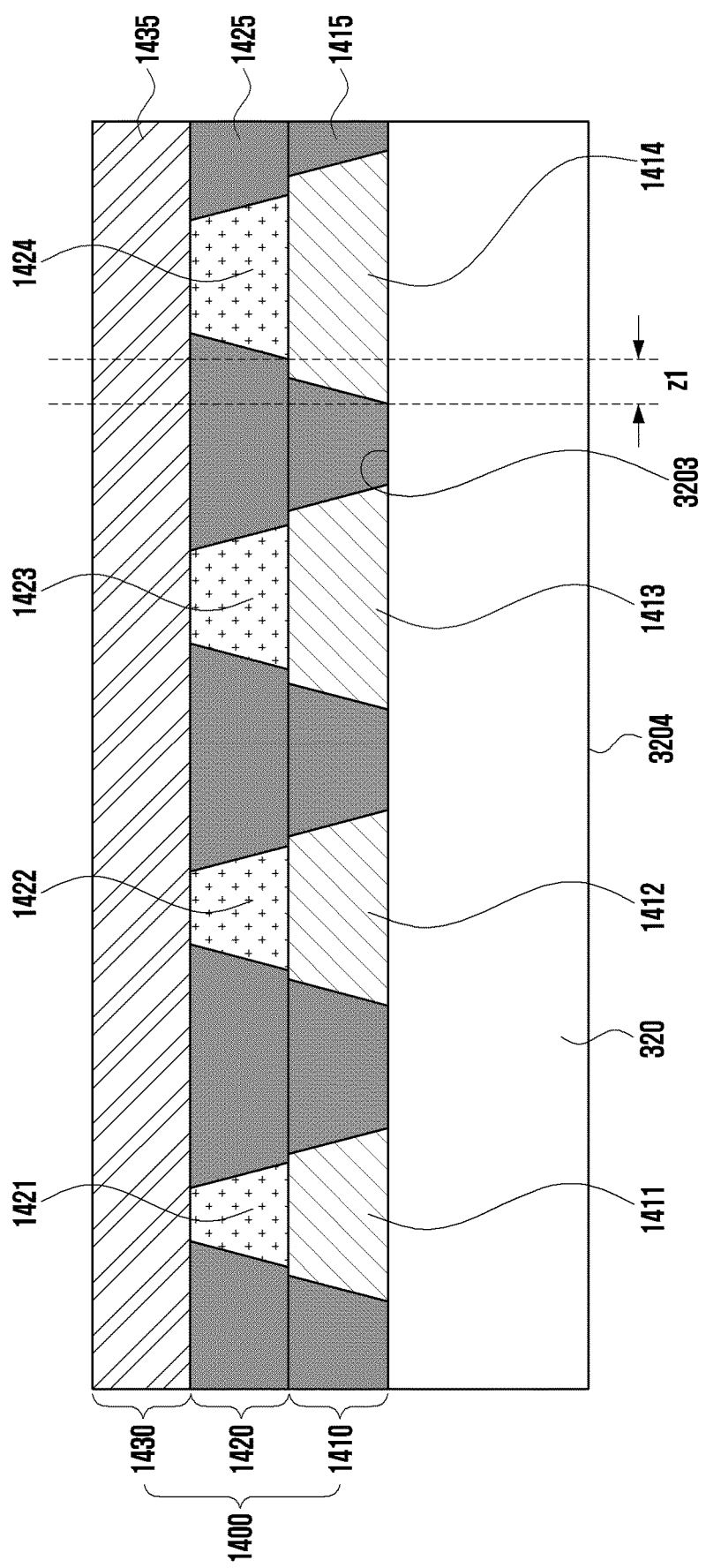
FIG. 14 is a sectional view illustrating a decorative structure including intaglio dots according to various embodiments of the disclosure.

FIG. 14 is a sectional view illustrating a decorative structure 1400 including intaglio dots according to various embodiments of the disclosure.

The decorative structure 1400 of FIG. 14 may be similar to the decorative structure 400 of FIG. 4 in at least some aspects, but other embodiments of the decorative structure may be included.

Referring to FIG. 14, the decorative structure 1400 may include a first layer 1410 including first intaglio dots 1411, 1412, 1413, and 1414 disposed in a first transparent or translucent material 1415, a second layer 1420 including second intaglio dots 1421, 1422, 1423, and 1424 disposed in a second transparent or translucent material 1425, and a third layer 1430 including an opaque material 1435, all of which are laminated on an inner surface 3203 of a transparent plate 320 in order. According to an embodiment, the first intaglio dots 1411, 1412, 1413, and 1414 disposed at the first layer 1410 may be formed to have a higher value than the first transparent or translucent material 1415. According to an embodiment, the second intaglio dots 1421, 1422, 1423, and 1424 disposed at the second layer 1420 may be formed to have a higher value than the second transparent or translucent material 1425. According to an embodiment, the first intaglio dots 1411, 1412, 1413, and 1414 and the second intaglio dots 1421, 1422, 1423, and 1424 may be formed at regular intervals, and be disposed in such a way that sizes thereof are gradually increased toward a surrounding direction of the transparent plate 320. According to an embodiment, when the transparent plate 320 is viewed from above, the first intaglio dots 1411, 1412, 1413, and 1414 may have a greater offset value z1 than the second intaglio dots 1421, 1422, 1423, and 1424. Therefore, when the transparent plate 320 is viewed from above, the first intaglio dots 1411, 1412, 1413, and 1414 and the second intaglio dots 1421, 1422, 1423, and 1424 may be projected such that boundary regions thereof are blurred.

Figure 15:
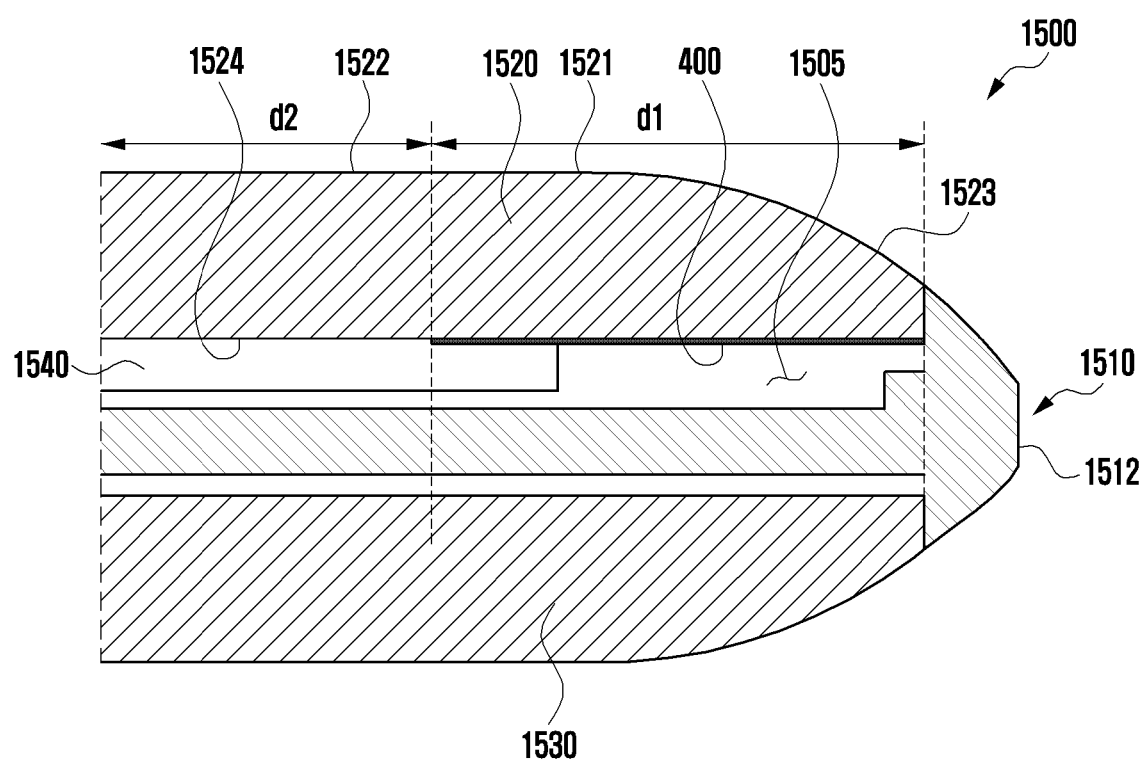
FIG. 15 is a sectional view illustrating key sections of an electronic device in which a decorative structure is disposed on a 2.5 D plate according to various embodiments of the disclosure.

FIG. 15 is a sectional view illustrating key sections of an electronic device 1500 in which a decorative structure 400 is disposed on a 2.5 D plate 1520 according to various embodiments of the disclosure.

The electronic device 1500 of FIG. 15 may be similar to the electronic device 100 of FIG. 1 in at least some aspects, but other embodiments of the electronic device may be included.

Referring to FIG. 15, the electronic device 1500 may include a housing structure 1510 including a lateral member 1512, a first plate 1520 (e.g., a transparent plate) disposed on one side of the housing structure 1510, and a second plate 1530 that faces away from the first plate 1520 and is disposed on the other side of the housing structure 1510. According to an embodiment, at least a part of the lateral member 1512 may be disposed to surround a space 1505 between the first plate 1520 and the second plate 1530. According to an embodiment, the first plate 1520 and/or the second plate 1530 may be formed of glass, sapphire, acryl, or a reinforced plastic that is a transparent material. According to an embodiment, the first plate 1520 may include an inner surface 1524 facing the housing structure 1510, and an outer surface 1521 facing away from the inner surface 1524. According to an embodiment, the outer surface 1521 of the first plate 1520 may include a plane section 1522 and a curve section 1523 that extends from the plane section 1522. According to an embodiment, the inner surface 1524 of the first plate 1520 may be formed as a plane section. Therefore, the first plate 1520 may be formed in the shape of a 2.5 D plate whose thickness is reduced toward the surrounding direction.

According to various embodiments, the electronic device 1500 may include a decorative structure 400 for gradation depiction. According to an embodiment, a display 1540 may be disposed in the electronic device 1500 so as to face the inner surface 1524 of the first plate 1520. According to an embodiment, the decorative structure 400 may be disposed in a peripheral region d1 of the first plate 1520 including at least a part of an inactive region (e.g., a black matrix (BM) region) from which an active region d2 of the display 1540 is removed. According to an embodiment, the decorative structure 400 may be disposed in at least a partial region of the inner surface 1524 formed as the plane section of the first plate 1520. According to an embodiment, the decorative structure 400 may include at least one of the above-mentioned decorative structures of various shapes.

According to various embodiments, although not illustrated, more minute depiction of the dot in view of a visual sense may be possible on the other surface of the transparent plate properly using a thickness profile of the dot formed after being printed and a shielding effect of translucent color printing. In another embodiment, a configuration of multi-layer dots among the layers may be disposed such that the dots are mutually inconsistent with respect to an axis corresponding to a laminating direction in an entire or partial region at each layer. In another embodiment, a line pattern may be replaced by at least some dots for the gradation depiction.

According to various embodiments, an electronic device (e.g., the electronic device 300 of FIG. 4) may include: a housing structure (e.g., the housing structure 310 of FIG. 4); a transparent plate (e.g., the transparent plate 320 of FIG. 6) that is coupled to the housing structure, defines an inner space (e.g., the inner space 3105 of FIG. 4) together with the housing structure, and includes an inner surface (e.g., the inner surface 3203 of FIG. 6) facing the inner space and an outer surface (e.g., the outer surface 3204 of FIG. 6) facing away from the inner space; and a decorative structure (e.g., the decorative structure 400 of FIG. 6) that is formed on the inner surface of the transparent plate in a peripheral region (e.g., the peripheral region d1 of FIG. 4) adjacent to a portion (e.g., the portion 313 of FIG. 4) of the housing structure, wherein the decorative structure may include: a first layer (e.g., the first layer 410 of FIG. 6) that is formed on the inner surface and includes a first transparent or translucent material (e.g., the first transparent or translucent material 415 of FIG. 6) and a repetitive pattern of first dots (e.g., the first dots 411, 412, 413, and 414 of FIG. 6) in the first transparent or translucent material; and a second layer (e.g., the second layer 420 of FIG. 6) that is formed on the first layer and includes a second transparent or translucent material (e.g., the second transparent or translucent material 425 of FIG. 6) and a repetitive pattern of second dots (e.g., the second dots 421, 422, 423, and 424 of FIG. 6) in the second transparent or translucent material and wherein, when the transparent plate is viewed from above, the first dots may be at least partially overlapped with the second dots.

According to various embodiments, the housing structure may include a first plate (e.g., the first plate 320 of FIG. 4), a second plate (e.g., the second plate 380 of FIG. 4) that faces away from the first plate, and a lateral member (e.g., the lateral member 312 of FIG. 4) that surrounds a space between the first plate and the second plate, and at least one of the first plate or the second plate may include the transparent plate.

According to various embodiments, the transparent plate may include a glass plate.

According to various embodiments, the glass plate may include an outer surface and/or an inner surface curved in the peripheral region.

According to various embodiments, the electronic device may further include a display (e.g., the display 330 of FIG. 4) that is disposed in the inner space and is disposed to be visible through a region of the first plate surrounded at least partly by the peripheral region.

According to various embodiments, when the transparent plate is viewed from above, the first dots may have a first size, and the second dots may have a second size larger than the first size.

According to various embodiments, when the transparent plate is viewed from above, the first dots may have a first size, and the second dots may have a second size smaller than the first size.

According to various embodiments, the number of first dots at the first layer may be smaller than the number of second dots at the second layer.

According to various embodiments, when the transparent plate is viewed from above, the first dots and/or the second dots may have a size that is gradually reduced or increased toward the portion of the housing structure.

According to various embodiments, the decorative structure may further include a third layer (e.g., the opaque material 435 of FIG. 6) that is formed on the second layer and includes an opaque material (e.g., the opaque material 435 of FIG. 6).

According to various embodiments, the first transparent or translucent material may include at least one of UV, urethane, a baking paint, an SF paint, a water paint, a fluid paint including a resin, a solvent, a pigment/dye, or an additive, and a pint including an organic/inorganic pigment, an organic dye, silver, or pearl, which can determine a hue of the decorative structure projected through the transparent plate.

According to various embodiments, the second transparent or translucent material may include a mirror silver layer formed of a mirror silver ink through a screen printing method.

According to various embodiments, at least one of the first dots which corresponds to at least one of the second dots may be removed.

According to various embodiments, at least one of the first dots may be formed to have a size and/or an area different from the other dots.

According to various embodiments, the electronic device may further include a fourth layer (e.g., the fourth layer 440 of FIG. 10) that is disposed between the first layer and the second layer and includes a third transparent or translucent material (e.g., the third transparent or translucent material 445 of FIG. 10) and a repetitive pattern of third dots (e.g., the third dots 441 and 442 of FIG. 10) in the third transparent or translucent material.

According to various embodiments, the electronic device may further include a fourth transparent or translucent material (e.g., the fourth transparent or translucent material 416 of FIG. 11) that is disposed at the first layer and has a refractive index different from that of the first transparent or translucent material.

According to various embodiments, the electronic device may further include fifth transparent or translucent materials (e.g., the fifth transparent or translucent materials 426 of FIG. 12) that are disposed at the second layer and have a reflectivity different from that of the second transparent or translucent material.

According to various embodiments, a manufacturing method of a decorative structure (e.g., the decorative structure 400 of FIG. 6) disposed on an inner surface (e.g., the inner surface 3203 of FIG. 6) of a transparent plate (e.g., the transparent plate 320 of FIG. 6) may include: a step of forming a first layer (e.g., the first layer 410 of FIG. 6) that includes a first transparent or translucent material (e.g., the first transparent or translucent material 415 of FIG. 6) on the inner surface of the transparent plate and a repetitive pattern of first dots (e.g., the first dots 411, 412, 413, and 414 of FIG. 6) in the first transparent or translucent material; a step of forming a second layer (e.g., the second layer 420 of FIG. 6), which includes a second transparent or translucent material (e.g., the second transparent or translucent material 425 of FIG. 6) and a repetitive pattern of second dots (e.g., the second dots 421, 422, 423, and 424 of FIG. 6) in the second transparent or translucent material, on the first layer; and a step of forming a third layer (e.g., the third layer 430 of FIG. 6) that is formed on the second layer and includes an opaque material (e.g., the opaque material 435 of FIG. 6).

According to various embodiments, when the transparent plate is viewed from above, the first dots may have a first size, and the second dots may have a second size larger than the first size.

According to various embodiments, when the transparent plate is viewed from above, the first dots may have a first size, and the second dots may have a second size smaller than the first size, and the number of first dots at the first layer may be smaller than the number of second dots.

The embodiments of the disclosure disclosed herein and in the drawings merely suggest specific examples to easily describe technical contents according to the embodiments of the disclosure and to help understanding of the embodiments of the disclosure, and are not intended to limit the scope of the embodiments of the disclosure. Thus, it should be interpreted that the scope of the various embodiments of the disclosure covers all alterations or modifications derived on the basis of the technical idea of the various embodiments of the disclosure, in addition to the embodiments disclosed herein.

The invention claimed is:

1. An electronic device comprising:
   a housing structure;
   a transparent plate coupled to the housing structure, configured to define an inner space together with the housing structure, and configured to include an inner surface facing the inner space and an outer surface facing away from the inner space; and
   a decorative structure formed on the inner surface of the transparent plate in a peripheral region adjacent to a portion of the housing structure,
   wherein the decorative structure includes:
      a first layer that is formed on the inner surface and includes a first transparent or translucent material and a repetitive pattern of first dots in the first transparent or translucent material; and
      a second layer that is formed on the first layer and includes a second transparent or translucent material and a repetitive pattern of second dots in the second transparent or translucent material, and
   wherein, when the transparent plate is viewed from above, the first dots are at least partially overlapped with the second dots.

2. The electronic device as claimed in claim 1, wherein the housing structure includes a first plate, a second plate that faces away from the first plate, and a lateral member that surrounds a space between the first plate and the second plate, and
   wherein at least one of the first plate or the second plate includes the transparent plate.

3. The electronic device as claimed in claim 1, wherein the transparent plate includes an outer surface and/or an inner surface curved in the peripheral region.

4. The electronic device as claimed in claim 1, further comprising a display that is disposed in the inner space and is disposed to be visible through a region of the first plate surrounded at least partly by the peripheral region.

5. The electronic device as claimed in claim 1, wherein, when the transparent plate is viewed from above, the first dots have a first size, and the second dots have a second size larger than the first size.

6. The electronic device as claimed in claim 1, wherein, when the transparent plate is viewed from above, the first dots have a first size, and the second dots have a second size smaller than the first size.

7. The electronic device as claimed in claim 6, wherein the number of first dots at the first layer is smaller than the number of second dots at the second layer.

8. The electronic device as claimed in claim 1, wherein, when the transparent plate is viewed from above, the first dots and/or the second dots have a size that is gradually reduced or increased toward the portion of the housing structure.

9. The electronic device as claimed in claim 1, wherein the decorative structure further includes a third layer that is formed on the second layer and includes an opaque material.

10. The electronic device as claimed in claim 1, wherein the first transparent or translucent material includes at least one of UV, urethane, a baking paint, an SF paint, a water paint, a fluid paint including a resin, a solvent, a pigment/dye, or an additive, and a pint including an organic/inorganic pigment, an organic dye, silver, or pearl, which can determine a hue of the decorative structure projected through the transparent plate.

11. The electronic device as claimed in claim 1, wherein the second transparent or translucent material includes a mirror silver layer formed of a mirror silver ink through a screen printing method.

12. The electronic device as claimed in claim 1, wherein at least one of the first dots which corresponds to at least one of the second dots is omitted.

13. The electronic device as claimed in claim 1, wherein at least one of the first dots is formed to have a size and/or an area different from the other dots.

14. The electronic device as claimed in claim 1, further comprising a third layer disposed between the first layer and the second layer and configured to include a third transparent or translucent material and a repetitive pattern of third dots in the third transparent or translucent material.

15. The electronic device as claimed in claim 1, further comprising a third transparent or translucent material disposed at the first layer and configured to have a refractive index different from that of the first transparent or translucent material.

* * * * *